(12) United States Patent
Egorov et al.

(10) Patent No.: US 10,019,245 B2
(45) Date of Patent: Jul. 10, 2018

(54) RESOLVING AN INITIALIZATION ORDER OF STATIC OBJECTS

(71) Applicant: ABBYY Development LLC, Moscow (RU)

(72) Inventors: Eugene Egorov, Moscow Region (RU); German Zyuzin, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 566 days.

(21) Appl. No.: 14/508,461

(22) Filed: Oct. 7, 2014

(65) Prior Publication Data

US 2015/0213113 A1    Jul. 30, 2015

(30) Foreign Application Priority Data

Jan. 30, 2014    (RU) .............................. 2014103153

(51) Int. Cl.
*G06F 17/30*    (2006.01)
*G06F 8/54*    (2018.01)
*G06F 8/41*    (2018.01)

(52) U.S. Cl.
CPC .......... *G06F 8/54* (2013.01); *G06F 17/30958* (2013.01); *G06F 8/433* (2013.01); *G06F 17/30445* (2013.01); *G06F 17/30463* (2013.01)

(58) Field of Classification Search
CPC .......... G06F 8/433; G06F 8/434; G06F 8/445; G06F 11/3404; G06F 17/30867; G06F 17/30958
USPC ........ 707/737, 798, 747, 791; 717/140, 116, 717/156
See application file for complete search history.

(56) References Cited

U.S. PATENT DOCUMENTS

| | | | | |
|---|---|---|---|---|
| 6,314,558 B1 * | 11/2001 | Angel | ................. | G06F 11/3612 714/35 |
| 7,895,666 B1 * | 2/2011 | Eshghi | .............. | G06F 17/30958 705/25 |
| 7,908,163 B2 * | 3/2011 | Malewicz | .............. | G06Q 10/06 705/7.13 |
| 8,201,176 B2 * | 6/2012 | Tatsubori | ................ | G06F 9/542 718/102 |
| 8,332,833 B2 * | 12/2012 | Archambault | ........ | G06F 8/4441 717/157 |
| 8,392,335 B2 * | 3/2013 | Waingold | .......... | G06F 17/30958 705/319 |
| 8,719,802 B2 * | 5/2014 | Maeda | ...................... | G06F 8/20 717/122 |
| 8,793,690 B2 * | 7/2014 | Vernier | ................ | G06F 9/5038 718/100 |
| 9,038,033 B1 * | 5/2015 | Hidayat | ................. | G06F 8/433 717/126 |
| 9,171,102 B1 * | 10/2015 | Zlatnik | ............. | G06F 17/30958 |
| 9,329,845 B2 * | 5/2016 | Cui | ........................ | G06F 8/434 |
| 9,329,899 B2 * | 5/2016 | Ailamaki | .............. | G06F 9/4843 |

(Continued)

*Primary Examiner* — Dangelino N Gortayo
(74) *Attorney, Agent, or Firm* — Lowenstein Sandler LLP (57) ABSTRACT

For resolving an initialization order of static objects located in a plurality of object files using a processor device, for each object file, the objects in the object file are categorized as defined static objects or undefined objects. A directed graph is created of the plurality of object files. Then, topological sorting is applied to the directed graph to yield the order of the plurality of object files that ensures a correct initialization of the static objects.

21 Claims, 7 Drawing Sheets

(56) References Cited

U.S. PATENT DOCUMENTS

2012/0197944 A1* 8/2012 Foti ................... G06F 12/0253
707/798

* cited by examiner

RESOLVING AN INITIALIZATION ORDER OF STATIC OBJECTS

CROSS REFERENCE TO RELATED APPLICATIONS

This application claims the benefit of priority under 35 USC 119 to Russian Patent Application No. 2014103153, filed Jan. 30, 2014; the disclosure of which is incorporated herein by reference.

BACKGROUND

Field of the Invention

The present invention relates in general to programming and more particularly, compiling programming code.

Description of the Related Art

Each C or C++ program is compiled from one or more source files. Each file may contain static objects (objects with static storage duration) that are initialized when the program is launched or when a dynamic library is loaded. Initialization is the process of calculating and setting some value in an object. A compiler generates object files from the source files, which have an .obj extension on DOS and Windows® (WINDOWS is a registered trademark of Microsoft Corporation) systems and an .o extension on Linux® (LINUX is a registered trademark of Linux Torvalds) systems, and these object files are passed to a linker. The linker links the code that is to become the executable module (which has an .com or .exe extensions on Windows® system for example) or dynamic library (which has an .dll extension on Windows® system and .so extension on Linux® system for example).

Upon occasion, the code is written such that to initialize some static object from a File A, the value of another static object from File B is required. Thus, when the object from File A is initialized, the object from File B must already be initialized.

SUMMARY

During porting, i.e. transferring code as part of large (for example, dozens and hundreds of source files) projects, the need arises to ensure that all global objects and static members of classes are initialized in the proper order. If this does not occur, the compiled program may not execute properly. For example, suppose the following in the File A.cpp:

int a=10;

And suppose that in another file in the project, File B.cpp, the following:

int b=a+100;

Assume the variables a and b are located in different files, and the C++ standard does not define their initialization order. If object a is initialized first followed by object b, then object a will be equal to 10 and object b=object a+10=110. However, if the objects are initialized in a different order, then when object b is initialized, the object that "precedes" implicitly (object A) will not yet be initialized. Therefore, object b is highly likely to receive an incorrect value, which may lead the program to work incorrectly.

Although no initialization order is defined, the initialization order typically is left to the discretion of the linker. The order in which the linker links the object files usually depends on the order in which these files are passed to it. The command to launch the linker generally has the following syntax:

linker.exe file.obj another_file.obj one_more_file.obj

In practice, the initialization order of objects in the executable module is associated with the order of the object files passed to the linker. This is usually either in a forward order (i.e., objects from the first file passed to the linker are initialized before others) or in a backward or reverse order (i.e., objects from the last file passed to the linker are initialized before others).

In addition to the aforementioned issue, the C++ standard states that all objects with static storage duration are originally zero-initialized. Thus, in the case of simple types, zero-initialization is performed, while in the case of complex types, initialization is performed by the default constructor. As a result, the object may end up with the correct value (if the initialization order is correct by chance) or zero.

When applied to the example above, if object b is initialized before object a, then at that moment object a will have the value zero and not 10 as one would expect and object b will be 100 rather than 110. Hence, the zero-initialization results in the appearance of errors that may be virtually impossible to find and diagnose, and from a user's perspective the program will not function correctly. From the perspective of a programmer involved in porting code, the program will not function correctly and no programming tool or utility will show where and what went wrong.

To alleviate the aforementioned concerns, well-known standard solutions have been applied. For example, getter functions or nifty or Schwarz counters may be applied. Another solution includes moving all static objects into a single source file. In still another solution, non-standard (compiler-specific) syntactic constructs, i.e. #pragma init, _attribute_((init_priority(XXX))) have been employed.

Although the aforementioned solution may yield adequate results, each requires manual reworking, which is extremely labor-intensive and time-consuming when working with hundreds of source files. Moreover, some of the methods are not portable (due to being under different compilers and/or systems). In fact, it is not sufficient to look at the C++ code in some single file and find the constructs that represent declarations of and/or calls to static variables. Each of the remaining source files in the project must be sequentially opened, studied, analyzed to find where these variables are used in them.

To address these needs, various embodiments for resolving an initialization order of the static objects are provided. In one embodiment, by way of example only, a method for resolving the initialization order of static objects located in a plurality of object files using a processor device is provided. For each object file, objects in the object file are categorized as defined static or undefined. Based on these data a directed graph of object files is created. A known method of topological sorting is applied to the directed graph to yield the order of object files that ensures the correct initialization of objects.

In addition to the foregoing embodiment, other exemplary system and computer program product embodiments are provided and supply related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION

As previously mentioned, current C and C++ standards do not define by default an order of initialization of static objects located in different object files. Hence, issues may arise when developing and porting existing code to other compilers (running on different operating systems) and occasionally even when porting code to a different version of the same compiler. As a result, the compiled program may not execute properly.

To address the need for such functionality, various embodiments of the present invention resolve an initialization order of objects of object files for the linker to accept the objects when forming an executable. In an embodiment, for each object file, a determination is made as to which objects are defined in the object file and which objects are not defined and used. This determination is made using the objects' attributes (object types), which can be read automatically in each object file. The object types may be divided into three basic categories: 1) the object is a defined static variable or constant, 2) the object is undefined, or 3) the object belongs to some other type and therefore is of no interest. The information about the defined static and undefined objects in object files can be used to construct an object file directed graph. Using the graph's topological sort, the order of the object files is determined along the directed graph, i.e. the order in which the object files (.obj) must be passed to the linker.

Figure 1:
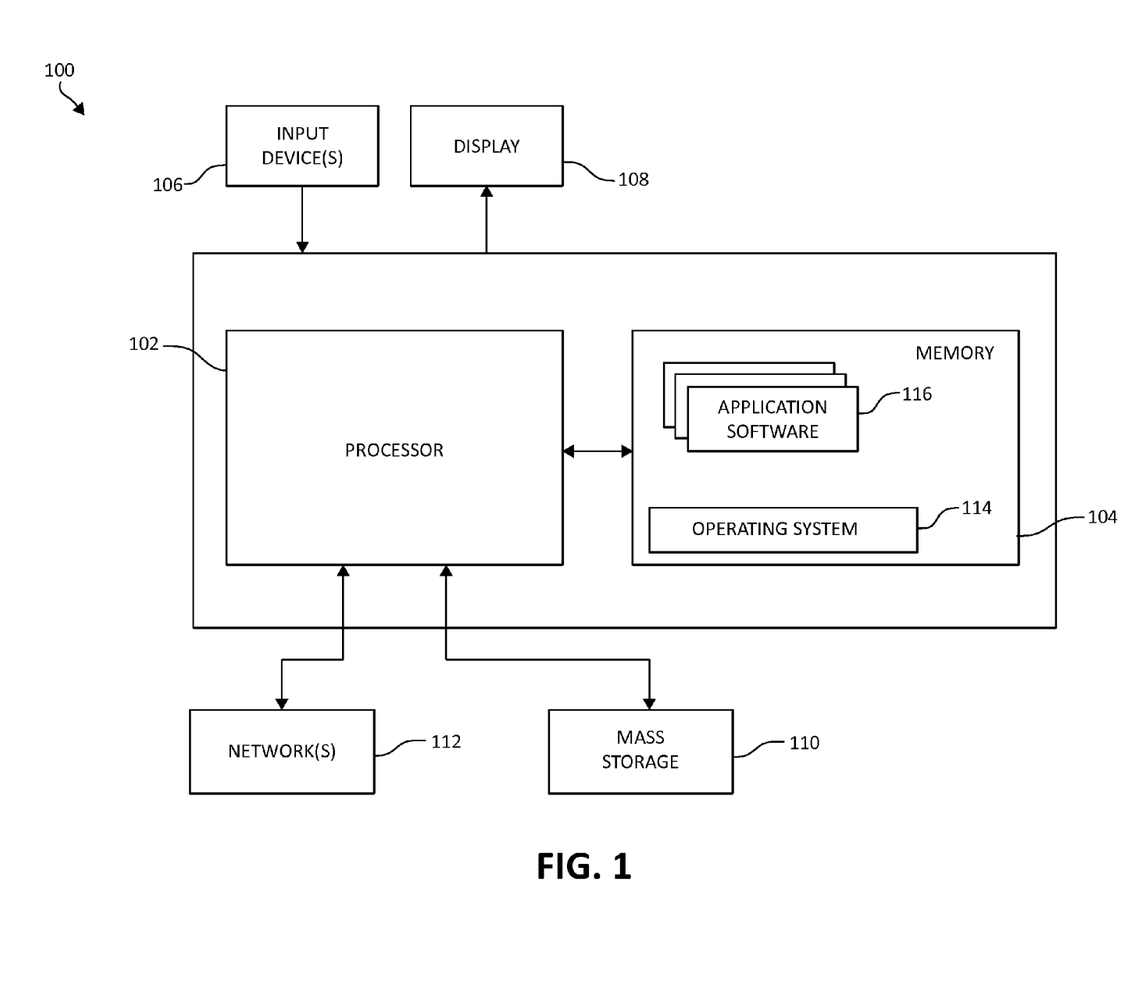
FIG. 1 is block diagram of hardware that may be used, in which aspects of the present invention may be realized.

Turning now to FIG. 1, an example of hardware 100 that may be used to implement the techniques disclosed herein is shown, in accordance with an embodiment of the present invention. The hardware 100 typically includes at least one processor 102 coupled to a memory 104. The processor 102 may represent one or more processors (e.g., microprocessors), and the memory 104 may represent random access memory (RAM) devices comprising a main storage of the hardware 100, as well as any supplemental levels of memory e.g., cache memories, non-volatile or back-up memories (e.g. programmable or flash memories), read-only memories, etc. In addition, the memory 104 may be considered to include memory storage physically located elsewhere in the hardware 100, e.g. any cache memory in the processor 102, as well as any storage capacity used as a virtual memory, e.g., as stored on a mass storage device 110. The hardware 100 also typically receives a number of inputs and outputs for communicating information externally. For interface with a user or operator, the hardware 100 may include one or more user input devices 106 (e.g., a keyboard, a mouse, a scanner etc.) and a display 108 (e.g., a Liquid Crystal Display (LCD) panel) and/or other output devices (not shown). For additional storage, the hardware 100 may also include one or more mass storage devices 110, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others.

Furthermore, the hardware 100 may include an interface with one or more networks 112 (e.g., a local area network (LAN), a wide area network (WAN), a wireless network, and/or the Internet among others) to permit the communication of information with other computers coupled to the networks. It should be appreciated that the hardware 100 typically includes suitable analog and/or digital interfaces between the processor 102 and each of the components 104, 106, 108 and 112 as is well known in the art.

The hardware 100 operates under the control of an operating system 114, and executes various computer software applications, components, programs, objects, modules, etc. indicated collectively by reference numeral 116 to perform the techniques described above.

Figure 2:
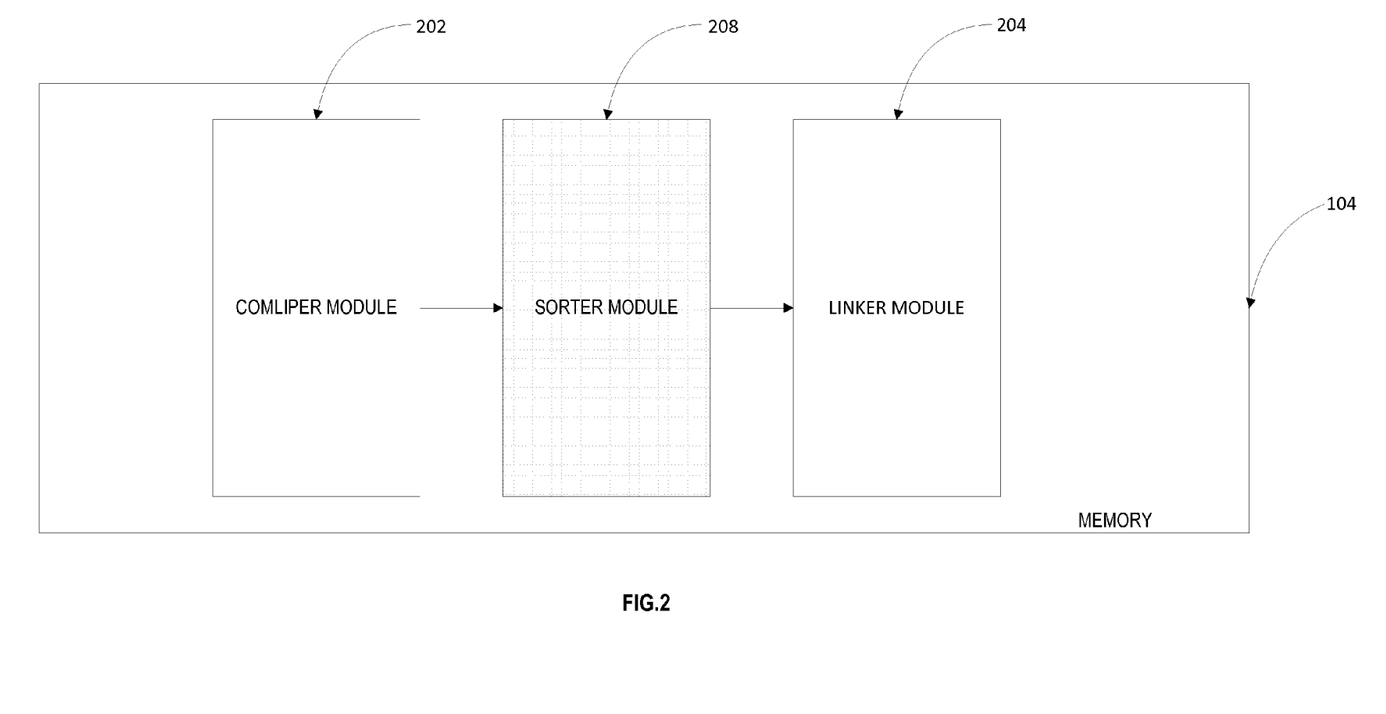
FIG. 2 is a block diagram of memory included in the hardware of FIG. 1, in which aspects of the present invention may be realized.

FIG. 2 is a block diagram of the memory 104, which communicates with and supplies the operating system 114 with the programs for execution. The memory 104 includes a compiler module 202, a sorter module 208, and a linker module 204. The compiler module 202 processes source files to translate source code from programming language to a machine code. As a result of the compiling process for each source file, a corresponding object file is created. The plurality of object files is passed to the sorter module 208 that, using a method of the present invention described in more details below, builds a list of object files in order that ensures the correct initialization of objects. This list is passed to the linker module 204 that links the object files and builds executable file or dynamic library. The compiled program (executable file or dynamic library) then may work correctly.

Figure 3:
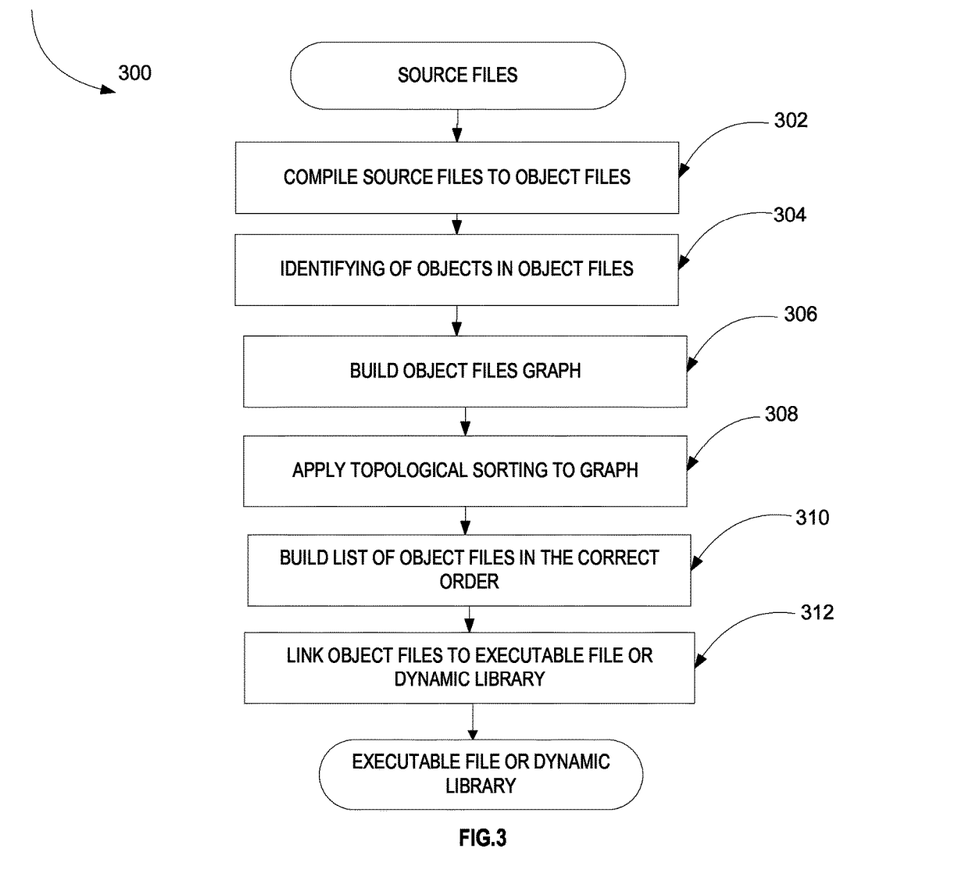
FIG. 3 is a flow chart diagram illustrating an exemplary method for resolving an initialization order of static objects located in a plurality of object files, in which aspects of the present invention may be realized.

Referring now to FIG. 3, an exemplary method 300 of resolving an initialization order of static objects located in a plurality of object files is shown in flow chart format. As a first step, the compiler module 202 compiles the source files to object files (i.e. .obj files on Windows® systems) (step 302). As will be appreciated by those with ordinary skill in the art, each source file is compiled to an object file each including zero or more objects.

Figure 7A:
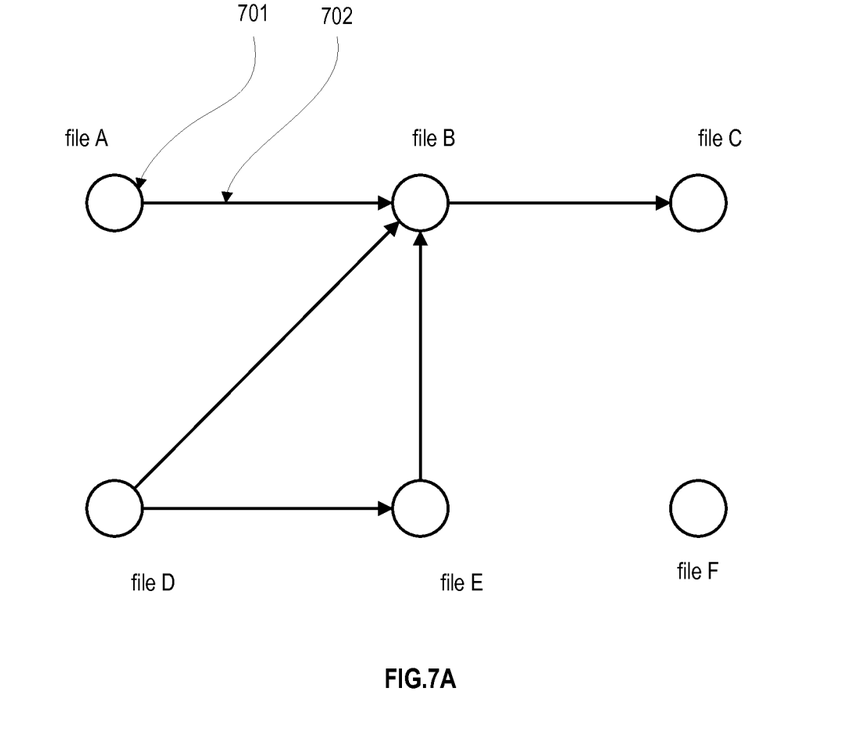
FIG. 7A is a directed graph that illustrates an example of a program project with six (6) source files, in which aspects of the present invention may be realized.

Next, the objects of the object files are identified at 304. As will be discussed in more detail below, the objects are categorized into defined static objects and undefined objects. Then in step 306, a directed graph is built using the categorized objects of the object files. A "directed graph" is a graph, or set of nodes connected by edges, where the edges have a direction associated with them. The directed graph that illustrates an example of a program project with six (6) source files is illustrated on FIG. 7 and will be explained in more detail below. A topological sorting method is then applied to the directed graph (step 308), and a list of object files in order ensuring the correct initialization of objects is built (step 310). After the list is built, the object files are linked to executable files or dynamic library (step 312).

Figure 4:
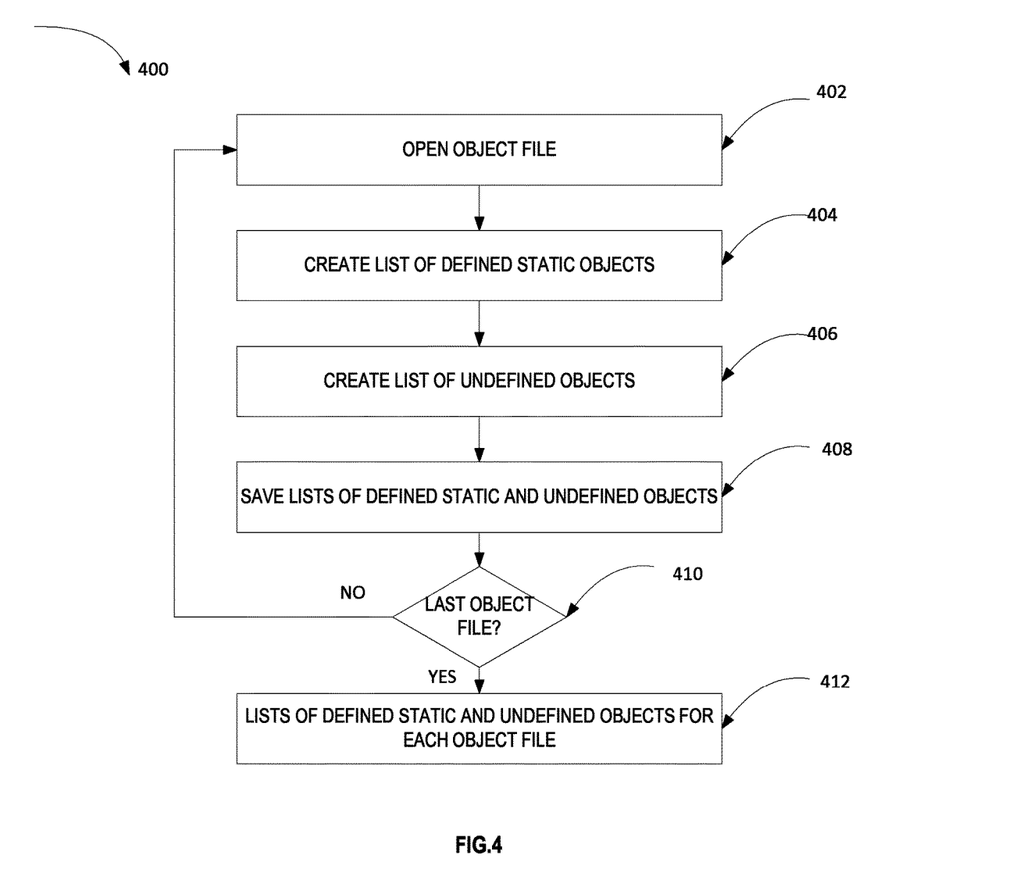
FIG. 4 is a flow chart diagram illustrating a step in the exemplary method for resolving an initialization order of static objects illustrated in FIG. 3, again in which aspects of the present invention may be realized.

Referring back to step 304, in order to identify the objects, each object file is analyzed. As illustrated in FIG. 4 providing an exemplary method 400 for identifying objects in an object file in flow chart format, at step 402, an object file is opened. Next, a list of defined static objects (for example, in the form of a supporting TXT file) is created (step 404). A list of undefined objects (for example, in the form of a supporting TXT file) is created (step 406). Although step 404 is depicted as occurring before step 406, those with ordinary skill in the art will appreciate that steps 404 and 406 can be performed in reverse order or both steps may be performed concurrently. In any case, both lists are saved at 408. After the lists of defined static and undefined objects are created, a determination is made as to whether the object file is a last object file at 410. If not, the method 400 returns to step 402 and is performed on the next object file. If the object file is the last one, the method 400 terminates and the lists of defined static and undefined objects for each object file are ready (step 412).

Figure 5:
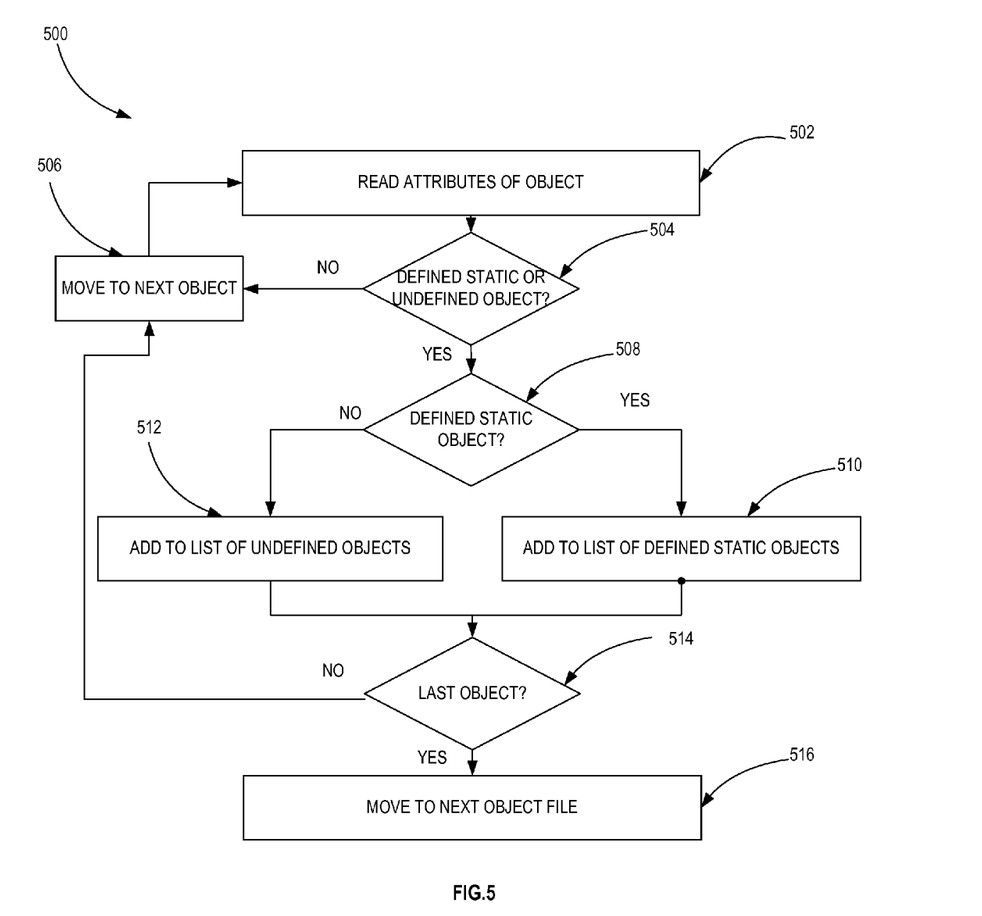
FIG. 5 is a flow chart diagram illustrating a step in the exemplary method illustrated in FIG. 4, in which aspects of the present invention may be realized.

To form the lists of defined static and undefined objects (steps 404 and 406) each object in the object file (from the first to the last object within each object file) is examined. With reference to FIG. 5, an exemplary method 500 of creating the lists is provided in flow chart form. Beginning at step 502, the attributes of an object of an object file are read, and the object is identified as being a defined static object, an undefined object, or neither a defined static object nor an undefined object. If the object is neither a defined static variable nor an undefined object (step 504), then the object is disregarded and the method 500 moves to the next object at 506; otherwise if the object is a defined static variable (step 508), then the object is grouped with other defined static objects and for example, the object's name (e.g., the object's identifier) is added to the list of defined objects (step 510). If the object is not a defined object (i.e., the object is undefined), the object is placed with other undefined objects and, for example, the object's name is added to the list of undefined objects at step 512. After the object is added to either the undefined or defined static object lists, both of the files with the lists of the defined static objects and undefined objects are saved. Then, a determination is made as to whether the object is the last object in the object file (step 514). If not, the method 500 returns to step 506, and step 502 is applied to the next object of the object file. Otherwise, the method 500 moves to the next object file at 516.

Returning to FIG. 3, after all of the object files are analyzed, the lists of undefined and defined static objects are used to build an object file directed graph (step 304). For example, the sorter module 208 builds the object file directed graph using the following rules:

a. The nodes of the directed graph are object files.
b. A graph edge from node A to node B is formed if object file A contains at least one undefined object O1, and object file B contains a defined static object O1 (i.e. with the same name/identifier).
c. An edge may pass from any node to any other node if condition b is satisfied for the two nodes, including pairs of nodes that connect two edges with opposite directions. (i.e. cyclic dependencies are allowed).

The constructed directed graph, in one of the embodiments of the invention, may be used as a visualization of the state of variables in the project. For example, it may be displayed in an application window on the display 108, saved in a file as graphics, text, or some other format, or sent to a printer, plotter, or any other peripheral device. In addition, the names (identifiers) of the variables may be used to designate edges in the visualization of the graph, making working with the graph more intuitive.

In another embodiment of the invention, the constructed directed graph may be analyzed to detect connected and unconnected areas, or any other mathematical relationships. The results of this analysis (and the graph itself) may then be used directly or indirectly.

Accordingly, use of the terminology referring to "building", "constructing", "categorizing", "identifying", "creating" and the like may refer to steps that are manifested in either electronic and/or physical fashion as facilitated through processor 102.

Figure 6:
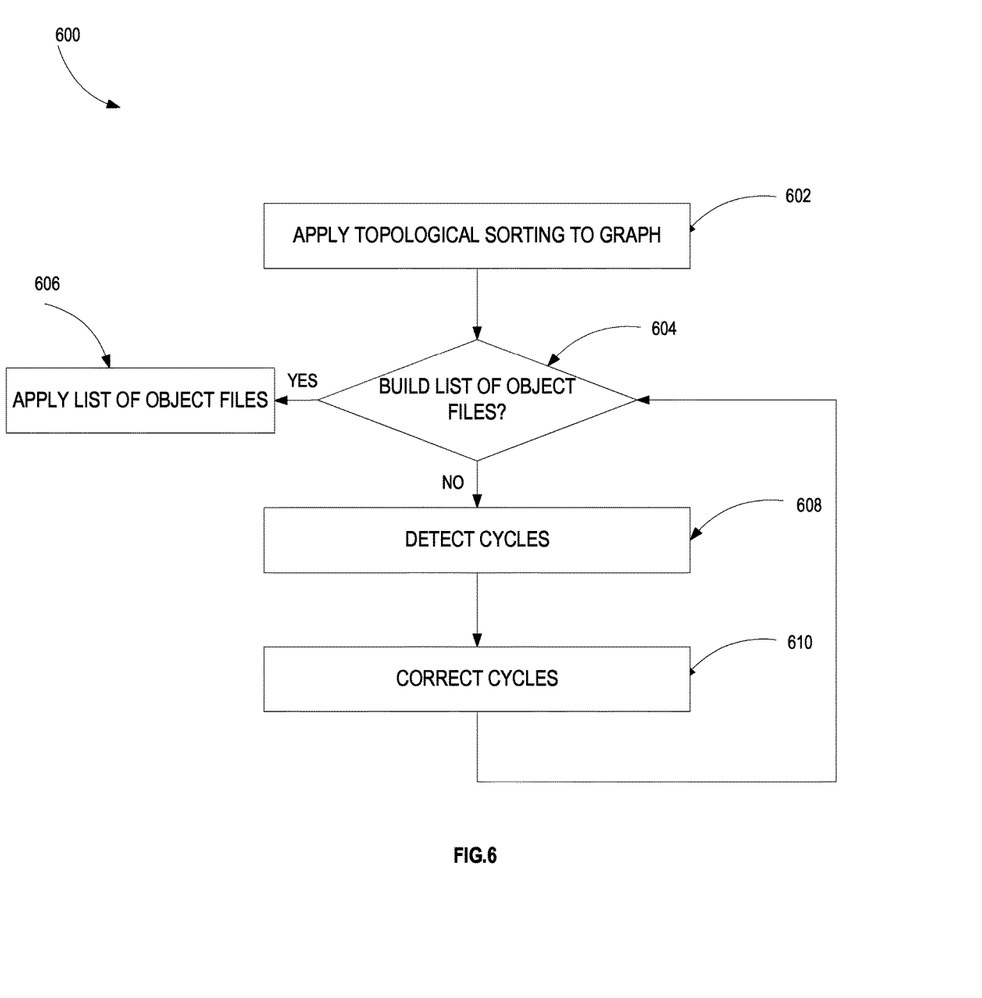
FIG. 6 is a flow chart diagram illustrating another step in the exemplary method for resolving an initialization order of static objects illustrated in FIG. 3, again in which aspects of the present invention may be realized.

A topological sort is then applied to the constructed directed graph (step 308) by using any known method for topological sorting. Application of the topological sort may or may not yield a list of all graph nodes (i.e. a list of object files) that does not contain any arcs leading from earlier to later nodes. Turning to FIG. 6, a flow diagram of a method 600 for building the topologically sorted list is provided. After application of the topological sorting method to the constructed directed graph (step 602), if a list of all graph nodes does not contain any edges leading from earlier to later nodes (step 604), then the list is used to show the order of object files that ensures the correct initialization of objects at step 606. Depending on the particular operating system, the initialization order may be in a forward or reverse order relative to the order of object files will be passed to the linker module 204.

If such a list cannot be constructed (at 604), a detection step 608 is performed to identify one or more cyclic dependencies or cycles in the constructed directed graph. In one of the methods of the invention, information about the detected cyclic dependencies (for example, lists of pairs of nodes that form cyclic dependencies) may be displayed in the application window of the display 108 in the form of text. In another embodiment, the detected cyclic dependencies may be displayed graphically on a full chart of the constructed directed graph, highlighted in some color or marked in some other way. After the cyclic dependencies are detected, they are corrected at step 610. For example, in an embodiment of method 600, the lists of the detected cyclic dependencies may subsequently be used to automatically process the project, e.g. to automatically send the appropriate pairs of files to the programmer responsible for finding and fixing initialization problems. Typically, there are rarely more than a few cyclic dependencies (e.g., 3-5 cyclic dependencies) to be fixed, even in extremely large projects (such as those including on the order of 500-1000 object files), and they can be effectively and completely corrected manually. In an example, correcting a cyclic dependency may consist of moving one of the variables to a different source file, using a getter function, or using some other known method.

In some instances, when applying the described method for detecting cyclic dependencies, "false" cyclic dependencies may appear in the directed graph. That is, the directed graph may contain a cyclic dependency, but there may be no real cyclic dependency in the initialization of static variables in the code. To resolve false cyclic dependencies, an algorithm may be used that unconditionally specifies the edge direction between two object files, for example, "object file A must be initialized before object file B". In this case, the relationship between nodes A and B is not formed based on rule b (i.e., "a graph edge from node A to node B is formed if object file A contains at least one undefined object O1, and object file B contains a defined static object O1") but rather based on the rule explicitly specified by the algorithm.

After the cyclic dependencies are corrected, the method iterates back to step 604, and because a list should be able to be constructed after cyclic dependency correction, the method 600 moves to step 606.

FIG. 7A illustrates the directed graph which is constructed for a small project, according to an embodiment of the present invention. The small project in which the source code is located in six (6) files. The nodes of the graph represent object files A, B, C, D, E, F, that were obtained as a result of compiling the source files. The object file A 701 contains at least one undefined object that is defined static object in the object file B, indicated by the edge 702 leading from file A to file B. Therefore, in the list of object files built as a result of the graph's topological sorting, the object file B precedes the object file A, and the static objects from the object file B will be initialized earlier then the static objects from the object file A. Otherwise, the program may work incorrectly. Object file F is an example of an object file that does not contain any undefined objects or defined static objects that are used in another object file. As such, objects defined in object file F can be initialized at any time.

Figure 7B:
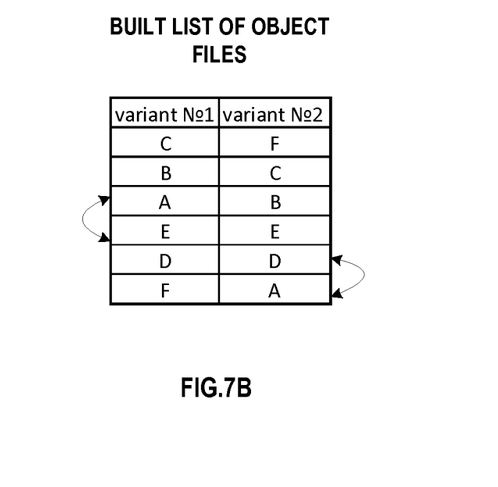
FIG. 7B is a table illustrating possible orders of object files depicted in FIG. 7A that guarantee correct initialization of the objects, in which aspects of the present invention may be realized.

With reference now to FIG. 7B, a table is provided showing some possible orders of object files that guarantee correct initialization of the objects, i.e. launching of the program without errors. The double arrows outside of the table indicate pairs of files which can be swapped in the corresponding sequences. For example, in variant No. 1, object files A and E may be swapped, while in variant No. 2, object files D and A may be swapped. Swapping the files will not cause errors during initialization of objects when the program is launched.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method comprising:
    for each object file among a plurality of object files comprising a plurality of objects, categorizing the objects in the object file as static objects defined as having a static storage duration or undefined objects not defined as having a static storage duration, wherein the static storage duration indicates that the static objects are initialized when an executable module comprising the static objects is loaded, and wherein the object files are generated by a compiler from source code in a plurality of source files corresponding to the object files;
    creating a directed graph of the object files, wherein the directed graph comprises a plurality of nodes that each represent one of the object files, wherein the directed graph comprises a plurality of edges between pairs of the nodes, wherein each edge among the edges has a direction from a first node among the nodes to a second node among the nodes, wherein the first node represents a first object file among the object files and the second node represents a second object file among the object files, and wherein the edge indicates that the first object file comprises one of the undefined objects that has a same identifier as one of the static objects in the second object file;
    applying, by at least one processor device, topological sorting to the directed graph to determine an order of the object files that ensures a correct initialization of the static objects by placing, for each of the edges, the second node before the first node in the order; and
    passing a list of the object files in the order to a linker that links the object files to build the executable module.

2. The method of claim 1, wherein the object files comprise additional objects, and wherein the method further comprises:
    categorizing each of the additional objects as neither a static object nor an undefined object; and
    disregarding each of the additional objects categorized as neither a static object nor an undefined object.

3. The method of claim 2, wherein categorizing each of the objects and the additional objects in the object file comprises:
    reading an attribute of each object of the object file to categorize the object in the object file as a static object, an undefined object, or neither a static object nor an undefined object;
    grouping the object of the object file with others of the static objects of the object file if the object is categorized as being a static object;
    placing the object of the object file with others of the undefined objects of the object file if the object is categorized as being an undefined object; and
    moving to another object of the object file if the object of the object file is categorized as neither a static object nor an undefined object.

4. The method of claim 1, wherein applying the topological sorting comprises identifying a list of the nodes that do not contain any edges leading from an earlier one of the nodes to one or more later ones of the nodes.

5. The method of claim 1, further comprising:
    determining that the order of the object files that ensures the correct initialization of the static ones of the objects is able to be determined from the topological sorting of the directed graph, wherein passing the list of the object files in the order to the linker is in response to determining that the order is able to be determined.

6. The method of claim 1, further comprising:
    determining that the order of the object files that ensures the correct initialization of the static ones of the objects is not able to be determined from the topological sorting of the directed graph;
    detecting one or more pairs of the object files that form one or more cyclic dependencies in response to determining that the order is not able to be determined; and
    correcting the cyclic dependencies.

7. The method of claim 1, wherein the static ones of the objects are located in a plurality of different ones of the object files.

8. A system comprising:
    a memory that stores instructions; and
    at least one processor device to execute the stored instructions to:
        for each object file among a plurality of object files comprising a plurality of objects, categorize the objects in the object file as static objects defined as having a static storage duration or undefined objects not defined as having a static storage duration, wherein the static storage duration indicates that the static objects are initialized when an executable module comprising the static objects is loaded, and wherein the object files are generated by a compiler from source code in a plurality of source files corresponding to the object files;
        create a directed graph of the object files, wherein the directed graph comprises a plurality of nodes that each represent one of the object files, wherein the directed graph comprises a plurality of edges between pairs of the nodes, wherein each edge among the edges has a direction from a first node among the nodes to a second node among the nodes, wherein the first node represents a first object file among the object files and the second node represents a second object file among the object files, and wherein the edge indicates that the first object file comprises one of the undefined objects that has a same identifier as one of the static objects in the second object file;
        apply topological sorting to the directed graph to determine an order of the object files that ensures a correct initialization of the static objects by placement of, for each of the edges, the second node before the first node in the order; and pass a list of the object files in the order to a linker that links the object files to build the executable module.

9. The system of claim 8, wherein the object files comprise additional objects, and wherein the processor device is further to:

categorize each of the additional objects as neither a static object nor an undefined object; and disregard each of the additional objects categorized as neither a static object nor an undefined object.

10. The system of claim 9, wherein, to categorize each of the objects and the additional objects in the object file, the processor device is further to:

read an attribute of each object of the object file to categorize the object in the object file as a static object, an undefined object, or neither a static object nor an undefined object;

group the object of the object file with others of the static objects of the object file if the object is categorized as being a static object;

place the object of the object file with others of the undefined objects of the object file if the object is categorized as being an undefined object; and move to another object of the object file if the object of the object file is categorized as neither a static object nor an undefined object.

11. The system of claim 8, wherein, to apply the topological sorting, the processor device is further to identify a list of the nodes that do not contain any edges leading from an earlier one of the nodes to one or more later ones of the nodes.

12. The system of claim 8, wherein the processor device is further to:

determine that the order of the object files that ensures the correct initialization of the static ones of the objects is able to be determined from the topological sorting of the directed graph, wherein the processor device is to pass the list of the object files in the order to the linker in response to the determination that the order is able to be determined.

13. The system of claim 8, wherein the processor device is further to:

determine that the order of the object files that ensures the correct initialization of the static ones of the objects is not able to be determined from the topological sorting of the directed graph;

detect one or more pairs of the object files that form one or more cyclic dependencies in response to the determination that the order is not able to be determined; and correct the cyclic dependencies.

14. The system of claim 8, wherein the static ones of the objects are located in a plurality of different ones of the object files.

15. A non-transitory computer-readable storage medium having instructions stored therein that, when executed by at least one processor device, cause the processor device to:

for each object file among a plurality of object files comprising a plurality of objects, categorize the objects in the object file as static objects defined as having a static storage duration or undefined objects not defined as having a static storage duration, wherein the static storage duration indicates that the static objects are initialized when an executable module comprising the static objects is loaded, and wherein the object files are generated by a compiler from source code in a plurality of source files corresponding to the object files;

create a directed graph of the object files, wherein the directed graph comprises a plurality of nodes that each represent one of the object files, wherein the directed graph comprises a plurality of edges between pairs of the nodes, wherein each edge among the edges has a direction from a first node among the nodes to a second node among the nodes, wherein the first node represents a first object file among the object files and the second node represents a second object file among the object files, and wherein the edge indicates that the first object file comprises one of the undefined objects that has a same identifier as one of the static objects in the second object file;

apply, by the processor device, topological sorting to the directed graph to determine an order of the object files that ensures a correct initialization of the static objects by placement of, for each of the edges, the second node before the first node in the order; and pass a list of the object files in the order to a linker that links the object files to build the executable module.

16. The computer-readable storage medium of claim 15, wherein the object files comprise additional objects, and wherein the instructions are further to cause the processor device to:

categorize each of the additional objects as neither a static object nor an undefined object; and disregard each of the additional objects categorized as neither a static object nor an undefined object.

17. The computer-readable storage medium of claim 16, wherein, to categorize each of the objects and the additional objects in the object file, the instructions are further to cause the processor device to:

read an attribute of each object of the object file to categorize the object in the object file as a static object, an undefined object, or neither a static object nor an undefined object;

group the object of the object file with others of the static objects of the object file if the object is categorized as being a static object;

place the object of the object file with others of the undefined objects of the object file if the object is categorized as being an undefined object; and move to another object of the object file if the object of the object file is categorized as neither a static object nor an undefined object.

18. The computer-readable storage medium of claim 15, wherein, to apply the topological sorting, the instruction are further to cause the processor device to identify a list of the nodes that do not contain any edges leading from an earlier one of the nodes to one or more later ones of the nodes.

19. The computer-readable storage medium of claim 15, wherein the instructions are further to cause the processor device to:

determine that the order of the object files that ensures the correct initialization of the static ones of the objects is able to be determined from the topological sorting of the directed graph, wherein the instructions are to cause the processor device to pass the list of the object files in the order to the linker in response to the determination that the order is able to be determined.

20. The computer-readable storage medium of claim 15, wherein the instructions are further to cause the processor device to:

determine that the order of the object files that ensures the correct initialization of the static ones of the objects is not able to be determined from the topological sorting of the directed graph;

detect one or more pairs of the object files that form one or more cyclic dependencies in response to the determination that the order is not able to be determined; and correct the cyclic dependencies.

21. The computer-readable storage medium of claim 15, wherein the static ones of the objects are located in a plurality of different ones of the object files.

* * * * *